US011433964B2

(12) United States Patent
Coaplen et al.

(10) Patent No.: US 11,433,964 B2
(45) Date of Patent: Sep. 6, 2022

(54) DROPPER SEATPOST ASSEMBLY HAVING A CUTOUT THEREIN

(71) Applicant: Fox Factory, Inc., Duluth, GA (US)

(72) Inventors: Joshua Coaplen, Asheville, NC (US); Thomas Pollock, Fletcher, NC (US)

(73) Assignee: Fox Factory, Inc., Duluth, GA (US)

( * ) Notice: Subject to any disclaimer, the term of this patent is extended or adjusted under 35 U.S.C. 154(b) by 115 days.

(21) Appl. No.: 16/935,955

(22) Filed: Jul. 22, 2020

(65) Prior Publication Data

US 2021/0031850 A1  Feb. 4, 2021

Related U.S. Application Data

(60) Provisional application No. 62/879,960, filed on Jul. 29, 2019.

(51) Int. Cl.
*B62J 1/08* (2006.01)
*B62K 19/36* (2006.01)

(52) U.S. Cl.
CPC .............. *B62J 1/08* (2013.01); *B62K 19/36* (2013.01); *B62J 2001/085* (2013.01)

(58) Field of Classification Search
CPC ........ B62J 1/08; B62J 2001/085; B62K 19/36
See application file for complete search history.

(56) References Cited

U.S. PATENT DOCUMENTS

| 6,478,278 | B1 * | 11/2002 | Duncan | B62J 1/06 |
| | | | | 248/407 |
| 10,053,173 | B1 * | 8/2018 | Metz | B62K 19/36 |
| 2015/0191208 | A1 * | 7/2015 | Hsu | B62J 1/08 |
| | | | | 403/322.3 |
| 2017/0240234 | A1 * | 8/2017 | Tsai | B62J 1/08 |
| 2018/0362106 | A1 * | 12/2018 | Miles | B60L 1/003 |
| 2019/0061852 | A1 * | 2/2019 | Shirai | B62K 19/36 |
| 2019/0071146 | A1 * | 3/2019 | Shirai | B62K 23/06 |

FOREIGN PATENT DOCUMENTS

TW             2457811    * 2/2012  ............... B62J 1/06

* cited by examiner

*Primary Examiner* — Tony H Winner

(57) ABSTRACT

A dropper seatpost assembly is disclosed. The assembly includes an upper post and a lower post having a tubular geometry, the lower post telescopically coupled with the upper post to form a length adjustable seatpost. An actuator located within the length adjustable seatpost, the actuator to allow or restrict a telescopic movement of the length adjustable seatpost. The actuator including an actuator interface configured to couple with a control cable that provides input to the actuator. At least one cutout in a sidewall of the lower post, the at least one cutout to provide access to the actuator interface of the actuator.

20 Claims, 6 Drawing Sheets

DROPPER SEATPOST ASSEMBLY HAVING A CUTOUT THEREIN

CROSS-REFERENCE TO RELATED APPLICATIONS (PROVISIONAL)

This application claims priority to and benefit of U.S. Provisional Patent Application No. 62/879,960 filed on Jul. 29, 2019, entitled "A Dropper Seatpost Assembly Having A Cutout Therein" by Joshua Coaplen, and assigned to the assignee of the present application, the disclosure of which is hereby incorporated by reference in its entirety.

FIELD OF THE INVENTION

Embodiments of the invention generally relate to systems and methods for internally coupling a cable with an actuator in a dropper seatpost.

BACKGROUND

Saddle (or seat) height and saddle orientation are important parts of a vehicle setup (such as a bicycle, unicycle, tricycle, and the like). If the saddle is too high, a rider sitting on the saddle will feel unstable. In contrast, if the saddle is too low, the rider sitting on the saddle would feel cramped. Moreover, what would be considered a good saddle height for riding along a road, may not be a good saddle height for climbing a hill, which may also be different than a good saddle height for riding down a hill, for riding across rough terrain, etc. As such, there is no universal saddle geometry settings, instead saddle settings are user and use case dependent.

BRIEF DESCRIPTION OF THE DRAWINGS

Aspects of the present invention are illustrated by way of example, and not by way of limitation, in the accompanying drawings, wherein.

Figure 1:
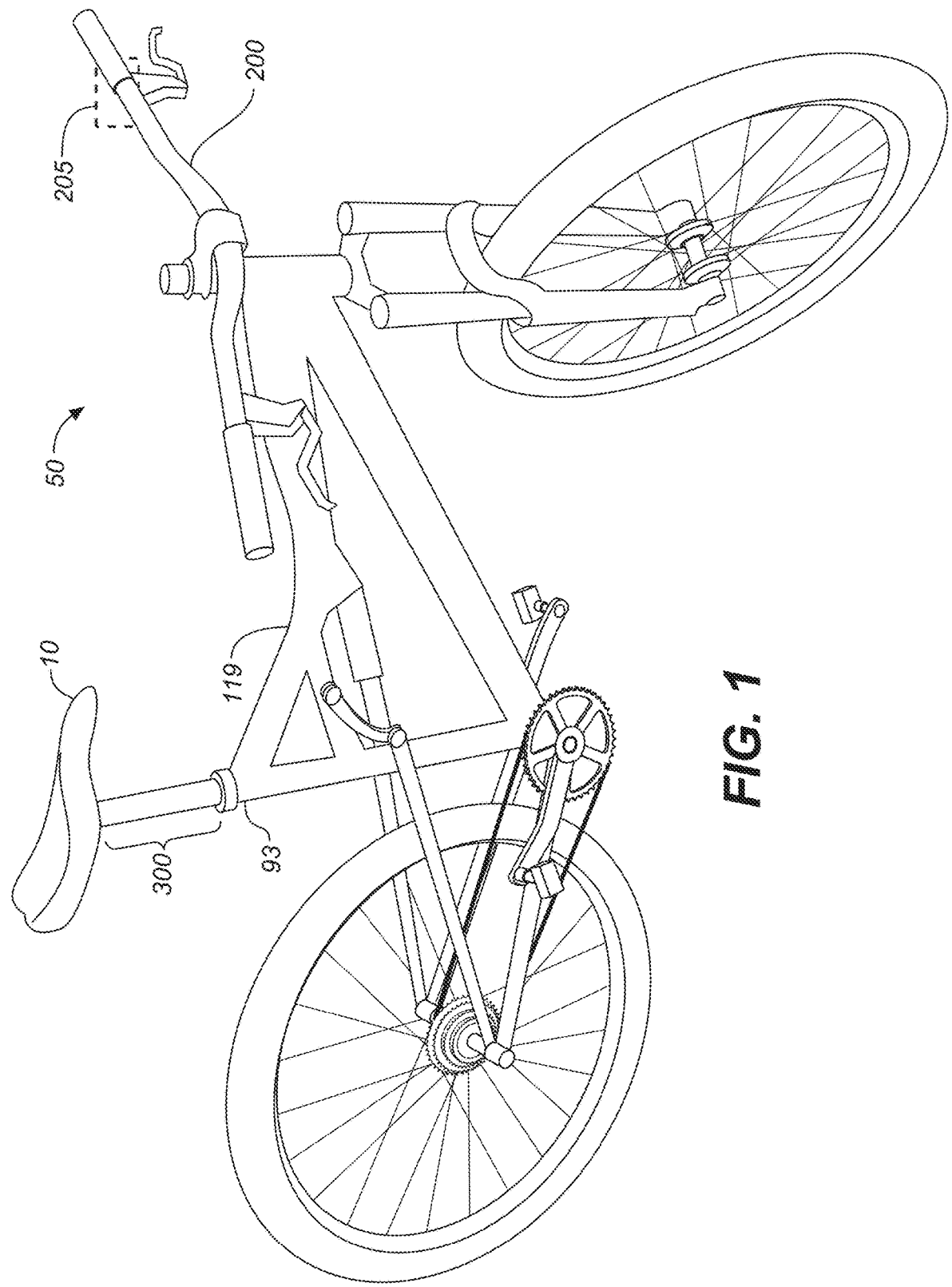
FIG. 1 is a perspective view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of vehicles that have an adjustable saddle, a bicycle will be used to provide guidance for the terms and directional language.

In general, a bicycle has a front (e.g., the general location of the handlebars and the front wheel) and a rear (e.g., the general location of the rear wheel). For purposes of the discussion the front and rear of the bicycle can be considered to be in a first plane. A second plane that is perpendicular to the first plane would be similar to an exemplary flat plane of the ground upon which the bicycle is ridden.

The term "seat tube" refers to a portion of a bicycle frame to which a seatpost is attached (often by insertion of a portion of the seatpost into the seat tube).

A seatpost is a stand-alone component, e.g., a tube or other geometric shaped member, that couples a bicycle saddle with the bicycle frame via the seat tube. In one embodiment, the bottom of the seatpost is designed to be inserted into the seat tube of the bicycle frame and the top of the seatpost will include (or be coupled to) a saddle clamp assembly. The saddle clamp assembly is used to couple a bicycle saddle with the seatpost, in one embodiment, by clamping with the saddle rails.

In assembly, the seatpost (with or without the saddle attached thereto) is partially inserted into the seat tube of the bicycle frame. In general, a user adjusts the amount of seatpost sticking out of the seat tube to establish the vertical height of the saddle (e.g., how far the saddle is above the ground plane, above the pedals, etc.). Once the seatpost (with saddle) is adjusted within the seat tube to obtain the desired saddle height and orientation, a clamping member (or another retaining device) is used about the seat tube to fasten the seatpost within the seat tube.

The saddle clamp assembly allows a user to adjust the horizontal location of the saddle (e.g., toward the front or rear of the bicycle) and the pitch of the saddle (e.g., nose-up, nose-level, nose-down). In a standard seatpost, once the desired saddle height is established, the seatpost is clamped into position where it remains until it is unclamped. This singular saddle height capability is important to allow different riders to utilize similar components and merely adjust the saddle height. However, as a rider tackles different challenges, it is becoming clear that a rider-to-bicycle geometry changes depending upon the terrain being traversed. For example, on a level road, the rider would have a certain saddle to pedal distance. However, when going down a hill (or over rough terrain, if standing for additional leverage, etc.), the same rider would likely prefer a shorter saddle to pedal distance to allow the rider to lower their center of gravity, lean further forward or backward, use their legs to absorb bumps, and the like. As such, it is helpful to be able to adjust the saddle height during a ride.

A dropper seatpost assembly (hereinafter dropper seatpost) is a seatpost that includes a lower post, an upper post, and an actuator assembly. In one embodiment, the lower post is a hollow or semi-hollow design. In one embodiment, the upper post is a hollow or semi-hollow design. In one embodiment, the lower post and the upper post are telescopically coupled such that the overall length of the dropper seatpost is modified by adjusting the telescoping extension and retraction.

In one embodiment, the telescoping extension and retraction capability of the upper and lower posts is controlled by the actuator assembly. In one embodiment, the actuator assembly is located in the lower post. In one embodiment, the actuator assembly is located in the upper post. In one embodiment, the actuator assembly could span the upper post and the lower post.

A dropper seatpost can be either an internally or externally routed. For example, in an internally routed dropper seatpost configuration, the cable actuator interface is inside the bicycle frame when the seatpost is installed on the bicycle. The cable runs through some portion of the bicycle frame and affixes to some type of control input (lever, button, etc.) on or near the handlebars. In contrast, in an externally routed dropper seatpost configuration, the cable actuator interface is outside the bicycle frame when the seatpost is installed on the bicycle. The cable runs along an external portion of the bicycle frame and affixes to the control input on or near the handlebars.

The following discussion provides a novel solution for a dropper seatpost cable-to-actuator coupling capability.

Referring now to FIG. 1, a perspective view of a bicycle 50 is shown in accordance with an embodiment. In general, the bicycle 50 includes pedals, wheels, a chain or other drive mechanism, brakes, an optional suspension, a saddle 10, a handlebars 200, a dropper seatpost 300, a user interface 205, and a bicycle frame 119. In one embodiment, dropper seatpost 300 is used adjustably retain the saddle height and yaw position with respect to bicycle frame 119.

In general, dropper seatpost 300 includes an upper post, a lower post, and an actuator assembly. The upper post and the lower post are telescopically coupled together to form the seatpost. In one embodiment, the upper post includes the saddle clamp assembly at a top thereof (e.g., at the end (or close to the end) of the upper post opposite the end of the upper post telescopically coupled with the lower post). In one embodiment, the lower post is inserted into and then fixedly coupleable with the seat tube 93 of bicycle frame 119.

In one embodiment, the actuator assembly controls the telescoping capability of the upper post and lower post configuration, such that a user can operate a control lever (discussed in FIG. 2) to "drop" the dropper seatpost to its lowest setting (e.g., the saddle clamp assembly is approximately at the top of the lower post), and then use the same control lever to "return" the dropper seatpost to its preset ride height. This two-position capability allows a rider to have a preferred saddle ride height and also a lowered saddle height for traversing downhills, bumpy terrain, or the like. Although two positions is discussed, the dropper seatpost could be adjustable to any number of different ride height positions, the use of two positions is used herein for purposes of clarity.

In one embodiment, the amount that dropper seatpost 300 extending from the bicycle frame 119 can be adjusted. In general, dropper seatpost 300 may be made of various materials, such as, but not limited to: steel, aluminum, titanium, carbon fiber, and aluminum wrapped in carbon fiber. Further discussion of dropper seatpost 300 is provided herein to include the discussion of FIG. 3.

Figure 2:
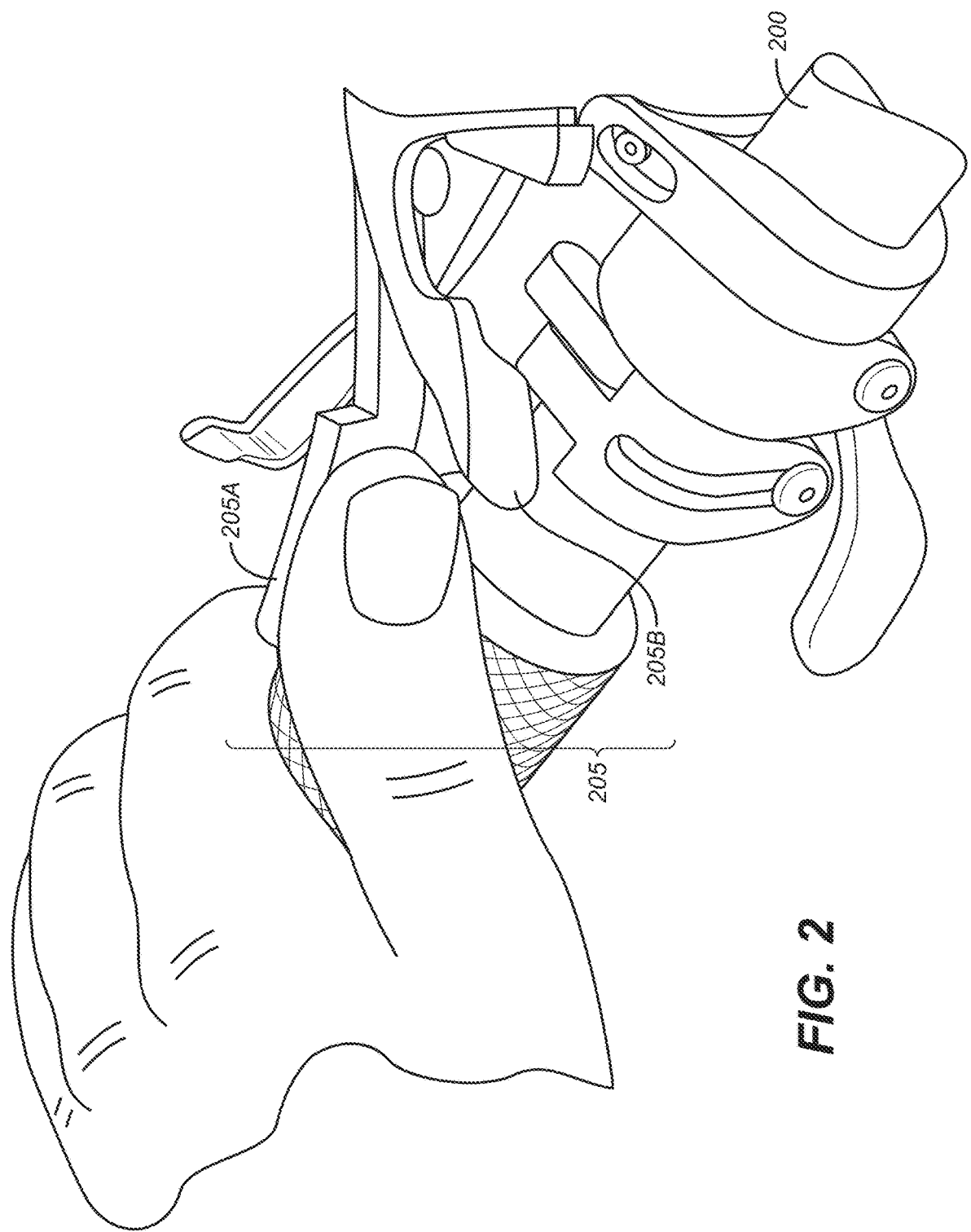
FIG. 2 is a perspective view of a handlebar with a control lever coupled therewith, in accordance with an embodiment.

Referring now to FIG. 2, a perspective view of handlebar 200 having the user interface 205 coupled therewith is shown in accordance with an embodiment. In one embodiment, the user interface 205 is mounted on handlebar 200. In one embodiment, user interface 205 is coupled with handlebar 200 via a clip or other retaining device. In one embodiment, user interface 205 is operatively coupled with actuator interface 621 (of FIGS. 3, 5, and 6) via a control cable, or the like. In one embodiment, user interface 205 communicates seatpost height instructions to the dropper seatpost 300. Of note, the user interface 205 may be, but is not limited to, any of the following components capable of communicating with the dropper seatpost 300, e.g., wireless device, power meter, heart rate monitor, voice activation device, GPS device having stored map, graphical user interface, button, dial, smart phone (e.g., iPhone™), lever, button, or the like. Moreover, although the user interface 205 is shown coupled with handlebar 200. In another embodiment, the user interface 205 could be located on another portion of the bicycle frame 119, on a mount coupled with a portion of the bicycle frame 119, handlebar 200, or the like.

The user interface 205 includes at least one control, such as the first user interface 205A and may include a second user interface 205B, it should be understood that in an embodiment, there may be only a single control, or in an embodiment there may be a set of controls. The user interface 205 is mechanically and/or electronically connected (via wire/cable and/or wirelessly) to various components within the dropper seatpost 300. When the cyclist moves the user interface 205, via the connections between the user interface 205 and the dropper seatpost 300, he is causing a cam within the dropper seatpost 300 to shift positions. The shifting cam, in turn, moves against valves, causing the valves within a valve system to open and/or close. This opening and/or closing of the valves control the fluid movement through and surrounding the valve system.

Figure 3:
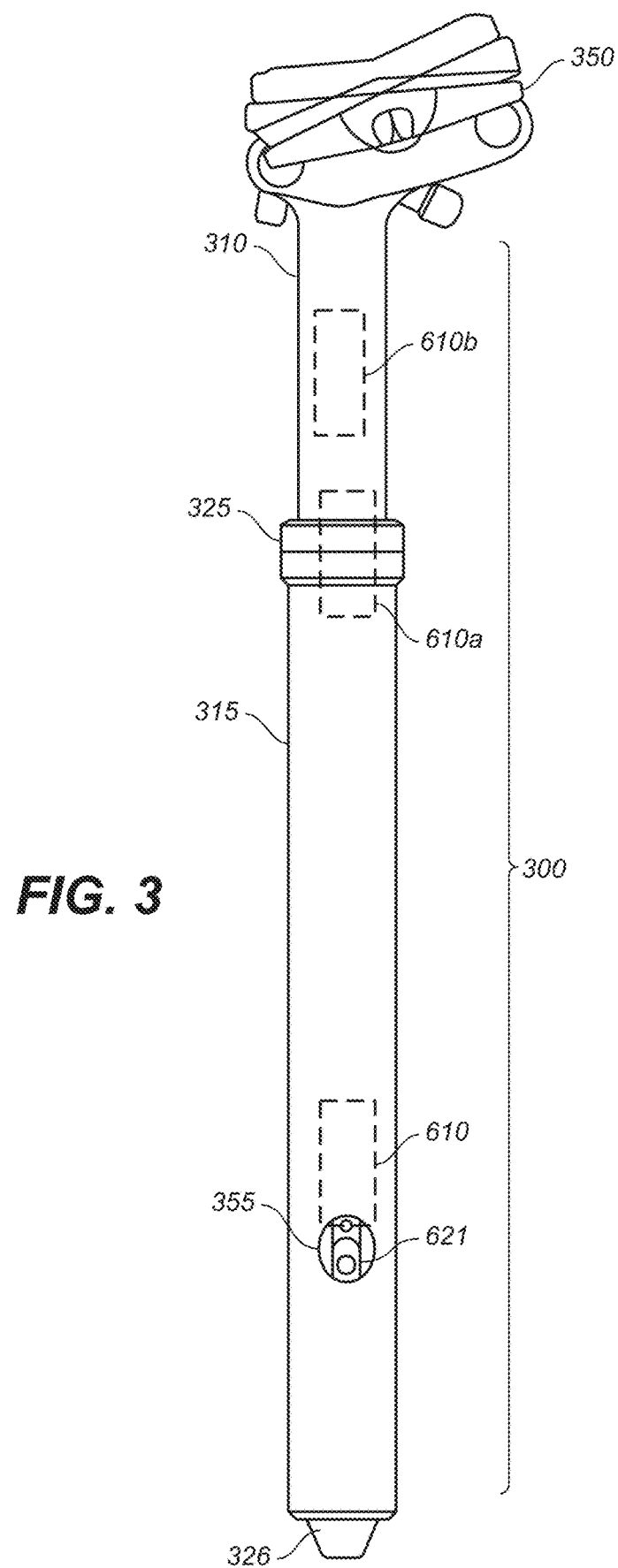
FIG. 3 is a perspective view of a dropper seatpost assembly having a single cutout, in accordance with an embodiment.

With reference now to FIG. 3, a perspective view of a dropper seatpost 300 coupled with a saddle clamp assembly 350 is shown in accordance with an embodiment. In one embodiment, the dropper seatpost 300 includes an upper post 310, a lower post 315, an actuator assembly having an actuator 610 and actuator interface 621, a cutout 355, and a bottom opening 326. In one embodiment, the actuator 610 is located in the lower post. In another embodiment, the actuator 610 (shown as 610b for purposes of clarity) is located in the upper post. In one embodiment, the actuator 610 (shown as 610a for purposes of clarity) could span the upper post and the lower post. Although FIG. 3 shows a number of actuators, in one embodiment, there is only one actuator 610 and the shown actuators 610, 610a, and 610b are indicative of a few of the possible placement locations for actuator 610. In one embodiment, the actuator interface 621 and actuator 610 are a single component. In one embodiment, actuator interface 621 and actuator 610 are two or more distinct and/or different components that could be located together within lower post 315 or separately within lower past 315 and upper post 310 (e.g., actuator interface 621 and either of actuator 610a or 610b locations).

In one embodiment, the lower post 315 includes a top opening (e.g., approximately at seat tube collar 325) to receive the upper post 310, a bottom opening 326 to receive the control cable (510 of FIG. 5), and a tubular sidewall axially extending between the top opening and the bottom opening of form the lower post 315, the outer diameter (OD) of the tubular sidewall of the lower post 315 is smaller than an inner diameter (ID) of a seat tube 93 of bicycle frame 119, the lower post 315 for insertion into the seat tube 93. In one embodiment, bottom opening 326 is formed in the lowest portion of lower post 315 relative to when lower post 315 is within seat tube 93.

In one embodiment, upper post 310 telescopically slides with respect to lower post 315 upon actuation of user interface 205 (of FIGS. 1 and 2). In one embodiment, the upper post 310 has an OD smaller than the ID of the lower post 315, such that a portion of the upper post 310 can telescopically slide within the lower post 315. In one embodiment, the upper post 310 has an ID larger than an OD of the lower post 315, such that a portion of the lower post 315 can telescopically slide within the upper post 310.

Figure 5:
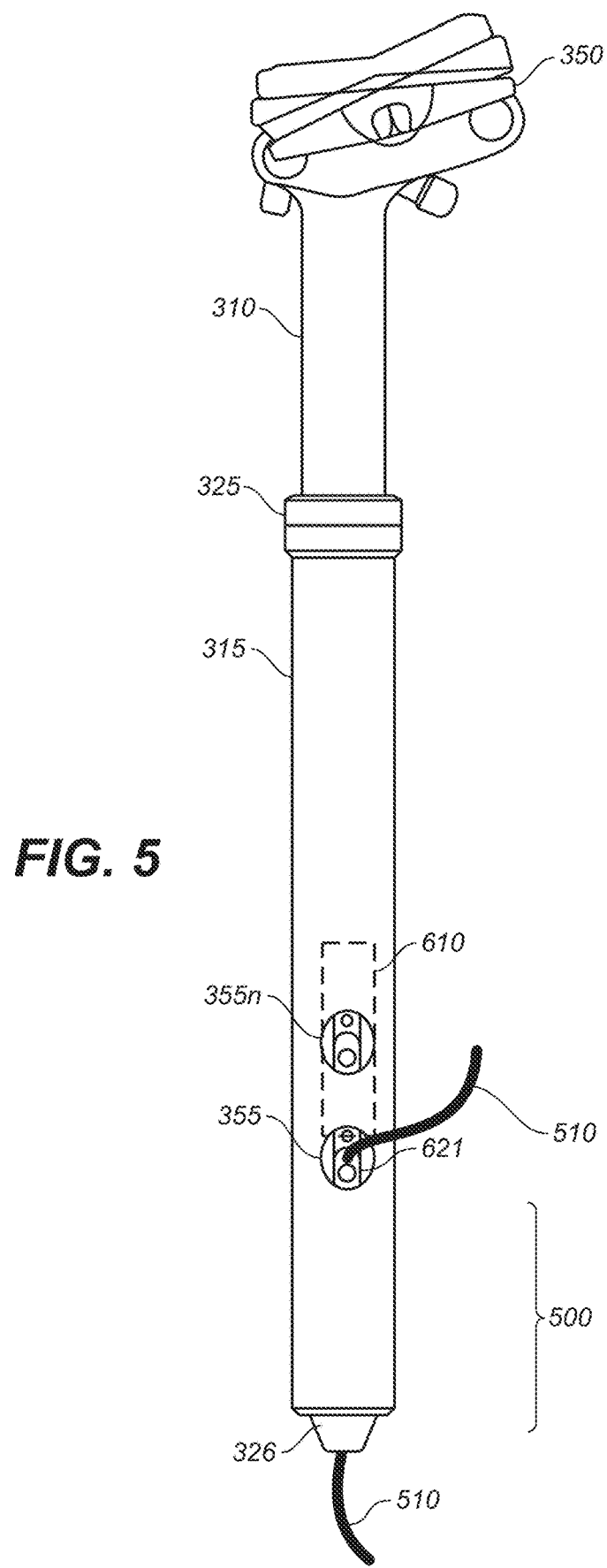
FIG. 5 is a perspective view of a dropper seatpost assembly having multiple cutouts, in accordance with an embodiment.
Figure 6:
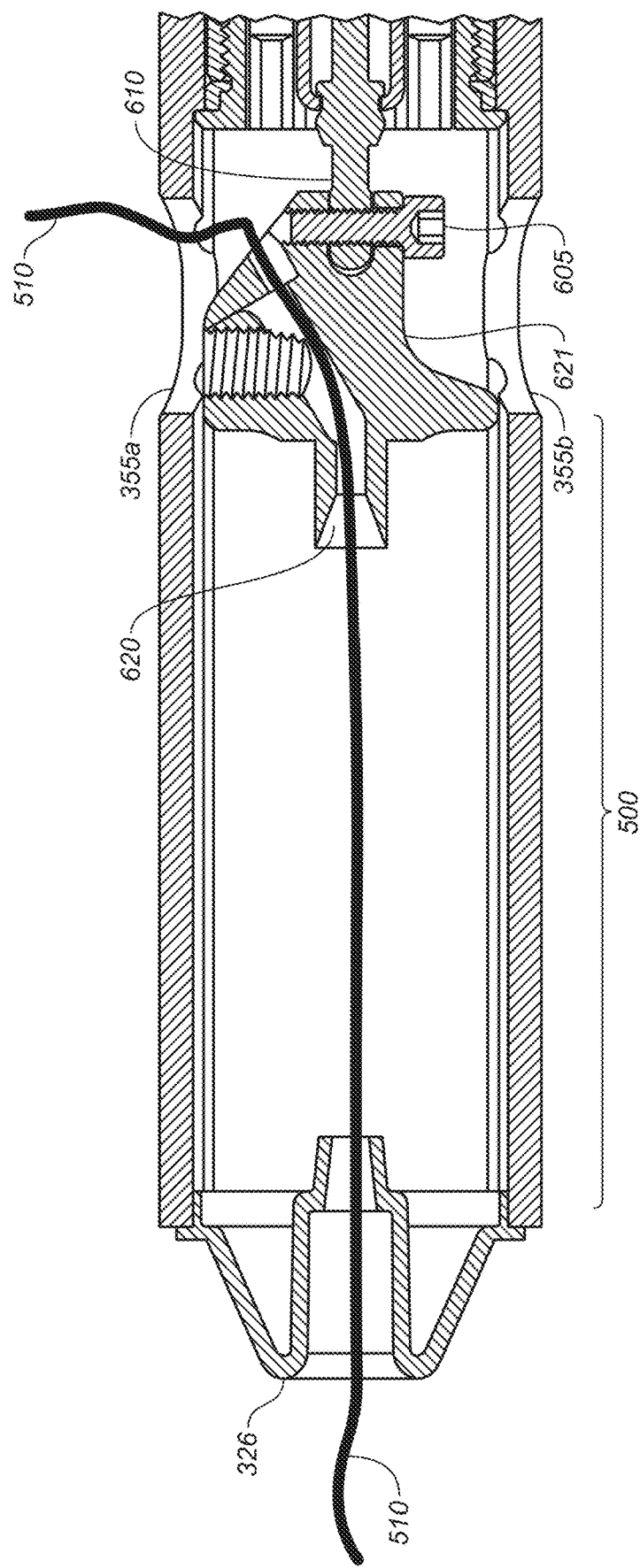
FIG. 6 is a cutaway view of the lower post of the dropper seatpost and the actuator, in accordance with an embodiment.

In general, cutout 355 (e.g., a cutout, window, hole, opening, or the like) is made through a portion of the wall of the lower post 315. In one embodiment, cutout 355 is taken from a portion of the dropper seatpost 300 that does not move with respect to the bicycle frame 119 once the dropper seatpost 300 is fixedly coupled with the seat tube 93 of bicycle 50. In general, there can be a single cutout 355 as shown in FIG. 3 or there can be multiple cutouts as shown in FIGS. 5 and 6. In one embodiment, the seat tube collar 325 is the highest portion of the lower post 315 and is indicative of the lowest possible setting for the dropper seatpost 300 when it is installed into the bicycle frame 119 seat tube 93.

In one embodiment, the upper post 310 is coupled with a saddle clamp assembly 350. In one embodiment, saddle clamp assembly 350 is a two clamp assembly having two fasteners to maintain a clamping force between the upper clamp and lower clamp to hold onto the rails of a saddle. However, in another embodiment, the saddle clamp assembly 350 could be any type of assembly used for coupling a saddle In one embodiment, upper post 310 and at least part of saddle clamp assembly 350 are formed as a single component. In another embodiment, upper post 310 and saddle clamp assembly 350 consist of two or more distinct and/or different components. Further, upper post 310 and saddle clamp assembly 350 are formed of the same materials, formed of different materials, etc. The materials include a group of materials such as, but not limited to, a metal, a composite, a combination of both metal and composite parts within each part, and the like. The metal options include, but are not limited to, steel, aluminum, titanium, and the like. The composite materials include carbon-based composites, plastics, and the like.

For example, an aluminum saddle clamp assembly 350 and an aluminum upper post 310, a titanium saddle clamp assembly 350 and a carbon upper post 310, a carbon saddle clamp assembly 350 and a titanium upper post 310, a carbon saddle clamp assembly 350 and a steel upper post 310, etc. Similarly, there can be other materials utilized such as carbon/metal mix (amalgamation, etc.) For example, saddle clamp assembly 350 consist of a carbon body with metal inserts, etc.

Additional details regarding the operation of a dropper seatpost assembly is found in U.S. Pat. No. 9,422,018 entitled "Seatpost" which is assigned to the assignee of the present application, and which is incorporated herein by reference in its entirety.

Figure 4:
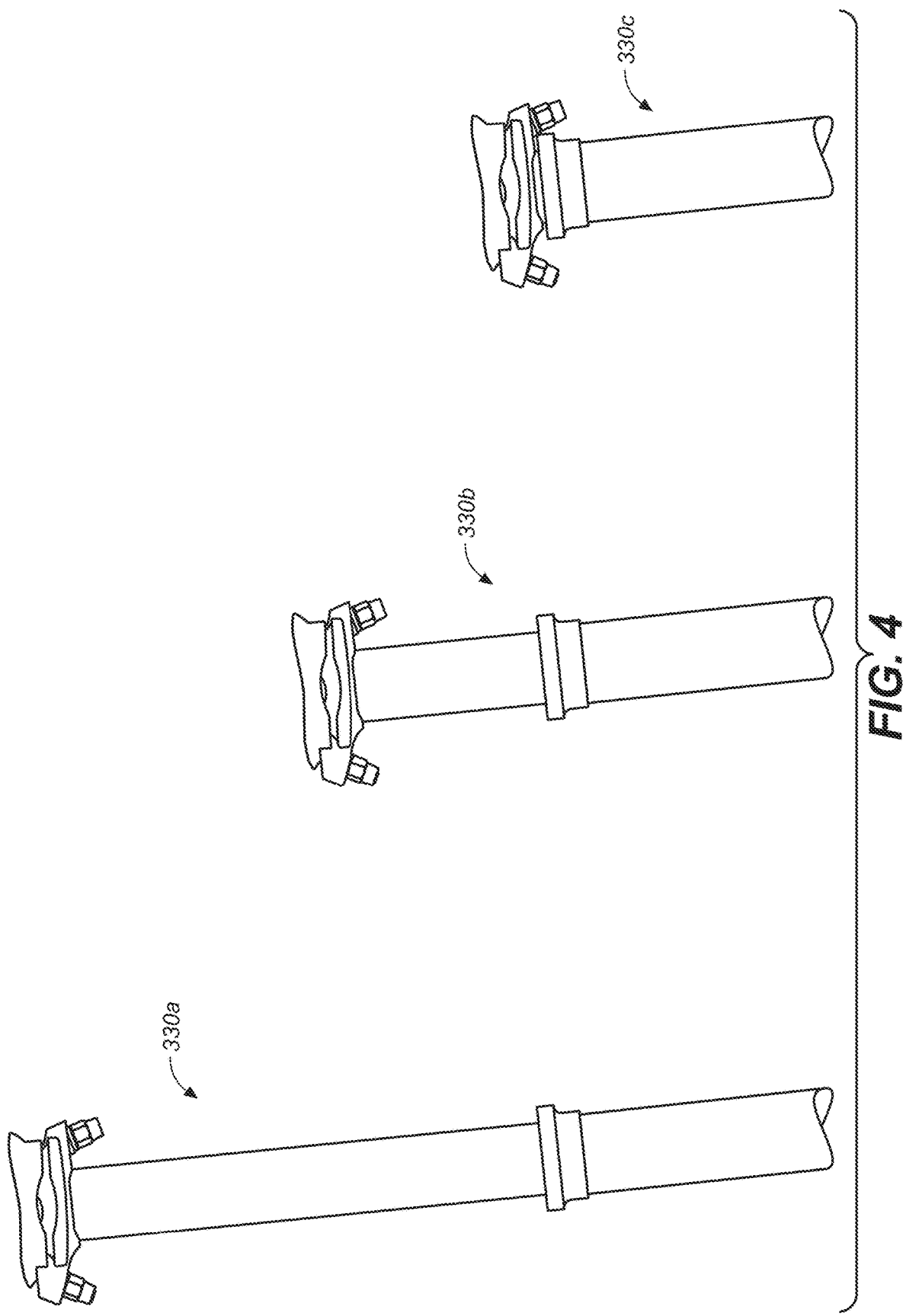
FIG. 4 is a perspective view of a plurality of different positions for the dropper seatpost, in accordance with an embodiment.

FIG. 4 is a perspective view of a plurality of different positions for dropper seatpost 300 shown in accordance with one embodiment. In FIG. 4, dropper seatpost 330a is shown in full extension, dropper seatpost 330b is shown in partial extension, and dropper seatpost 330c is shown in full compression. In one embodiment, the dropper seatpost can be remotely shortened (lowered) using user interface 205 (as shown and described in FIGS. 1 and 2).

In one embodiment, when movement of the saddle is desired, (e.g., due to hills, terrain, aerodynamics, speed, etc.), a rider will cause the dropper seatpost 300 to lower by triggering user interface 205 while the rider also depresses the saddle. Typically, the actuating lever of a dropper seatpost will open a valve or latch in the actuator 610 of dropper seatpost 300 so that the dropper seatpost 300 can move up or down. In one embodiment, dropper seatpost 300 has an air spring and use the rider's weight to move the saddle down, and will only raise the saddle back to the initial position when the valve or latch internal to the dropper seatpost 300 is opened (via user interface 205). In one embodiment, dropper seatpost 300 is "micro-adjustable". There are two types of micro-adjustable seatposts: (1) seatposts that can be continuously adjusted to an infinite number of positions; and (2) seatposts that can only be adjusted to a predetermined (preprogrammed) number of positions.

For example, with regard to dropper seatposts that can only be adjusted to a preprogrammed number of positions, the dropper seatpost adjustment positions may be that of the following three positions: up; middle; and down. Generally, the rider prefers that the dropper seatpost 300 be in the "up" position during a ride over flat terrain, a road surface, or pedaling up small hills on a road surface. The rider generally prefers that the dropper seatpost 300 be in the "middle" position when the rider still wants a small amount of power through pedaling but yet would still like the saddle to be at least partially out of the way. This situation may occur while riding down a gentle hill or when the rider anticipates having to climb a hill immediately after a short decent. The rider generally prefers that the dropper seatpost 300 be in the "down" position when the rider is descending a steep hillside. In this situation, the rider would be positioned rearward of the saddle. By doing such, the rider changes his center of gravity to be rearward of the bicycle 50, thereby accomplishing a more stable and safer riding position.

Referring now to FIG. 5, a perspective view of a dropper seatpost 300 having multiple cutouts is shown in accordance with an embodiment. in one embodiment, cutout 355 and cutout 355n are through the wall of the lower post 315 of dropper seatpost 300.

Prior designs of internally routed dropper seatpost has a cable/actuator at the bottom of the outer post. In a gravel or road bicycle, the dropper seatpost 300 travel does not need to be as long and as such, the lower post 315 of the dropper seatpost 300 can be trimmed or otherwise shortened.

However, if the actuator 610 (see FIG. 6) is at the bottom of the lower post, then the dropper seatpost 300 cannot be trimmed. By moving the actuator 610 and actuator interface 621 to the interior of the dropper seatpost 300, an amount of material (e.g., trimmable portion 500) from the outer post of the dropper seatpost 300 can be trimmed away to obtain a weight reduction, a better fit between dropper seatpost 300 and bicycle frame 119, or the like. In one embodiment, the actuator 610 is located in the lower post. In one embodiment, the actuator 610 is located in the upper post. In one embodiment, the actuator 610 could span the upper post and the lower post. In one embodiment, the actuator interface 621 and actuator 610 are a single component. In one embodiment, actuator interface 621 and actuator 610 are two or more distinct and/or different components that could be located together within lower post 315 or separately within lower past 315 and upper post 310.

In one embodiment, the dropper seatpost 300 is an internally routed dropper seatpost, which means the actuation mechanism (e.g., cable 510 or other mechanical feature) is routed through the bicycle frame 119 and then coupled to the actuator interface 621 (e.g., using set screw 605, or the like) located within the lower post 315 of the dropper post inside the bicycle frame 119. Actuator interface 621 is coupled with actuator 610 and provides any received input to actuator 610.

This concept has not been previously necessary because there has previously been no need to have the cable management as described herein. In other words, in the mountain bicycle arena, the travel length of the dropper seatpost 300 is approximately 100 mm or more to provide a large range of motion for the dropper seatpost 300. The longer travel distance could be important and is based on aspects such as the hill climb steepness, hill decent steepness, terrain being traversed, obstacles being traversed, and the like. Because of this, cable management is not as important as having the desired saddle height range capability.

However, in road and gravel bicycles, the travel length of the dropper seatpost 300 is shorter (e.g., approximately 99 mm or less) to account for the smaller range motion needed for the dropper seatpost 300. For example, the saddle height changes are shorter and are based on the hill climb, flat ride, and hill decent without worry about significant changes in the terrain being traversed. In other words, the gravel or road bicycle is not designed to encounter the vast terrain and obstacles that a mountain bicycle is designed to encounter. As such, the ride height changes to the saddle will also be more nuanced. Further, the streamline characteristics of the road and gravel bicycle are much more important that the streamline characteristics of a mountain bicycle. As such, the ability to remove excess cable 510 and stow the remaining cable 510 is also important in the gravel and road bicycle applications. Thus, while the technology is able to be used in mountain bicycle dropper seatpost 300 applications (or even non-dropper seatpost applications) for weight savings. In one embodiment, it is the cable routing cutout of the dropper seatpost 300 for gravel and road bicycles is used for design and utility reasons.

Thus, in one embodiment, adding one or more cutout(s) to the lower post 315 of the dropper seatpost 300 allows for shorter cable/housing lengths which is increasingly important for gravel and road bicycle applications where extra cable 510 length is difficult to manage and can be considered unsightly.

Moreover, the cutout(s) in the lower post 315 of the dropper seatpost 300 allows the actuator 610 and actuator interface 621 to be located deeper within dropper seatpost 300. In general, the actuator interface 621 can be any connection between the actuator 610 and the user interface 205. In one embodiment, the cutouts also increase the potentially trimmable portion 500 (of FIGS. 5 and 6) of the dropper seatpost 300. For example, since the required length of lower post 315 is decreased (due to the movement of the actuator 610 internally upward within lower post 315 or in one embodiment, within upper post 310; and the movement of actuator interface 621 internally upward within lower post 315,), if a rider wanted to reduce weight, the rider could trim any or all of trimmable portion 500 of lower post 315 which would result in a weight savings without detrimentally affecting the operation of dropper seatpost 300.

Adding the cutout(s) to the lower post 315 of the dropper seatpost 300 provides access to cable 510 to actuator interface 621 coupling. The cutout(s) also allow the dropper seatpost 300 to be held in place with the seat tube 93 of bicycle frame 119 during installation, which makes the dropper seatpost installation easier to manage, cable management easier to accomplish, and the like.

For example, without the cutout(s), the actuator-to-cable connection, e.g., actuator interface 621, is not reasonably likely to be moved into the area within the lower post 315 as there would be no way to modify, replace, or adjust the connection between cable 510 and actuator interface 621. Thus, while the internal actuator interface 621 could be initially coupled with the cable 510 during the manufacture, it would be significantly more difficult to access the cable 510 to actuator interface 621 connection for replacement, repair, or the like.

In one embodiment, the cutout(s) 355 are placed proximal (or near, at, within a predefined distance of, within a margin of error, etc.) to the neutral bending axis of the dropper seatpost 300, e.g., the sides of the dropper seatpost 300 versus the front or back of the dropper seatpost 300, since these are the lowest stress areas of the dropper seatpost 300. However, the cutout(s) could be located in the front, back, side, or a combination thereof.

In general, a cable 510 would include a ferrule on one end of the cable 510 and then just cable 510 on the other end. Thus, the ferrule is coupled with either the dropper seatpost actuator interface 621 or with the control input on or near the handlebars. In one embodiment, e.g., when the ferrule is coupled with the control input, the cable 510 is routed through the bicycle frame 119, through the bottom of the dropper seatpost 300 and then fed out through the cutout 355a. The cable 510 is then coupled to the actuator interface 621 (e.g., with a set screw 605, or the like). In one embodiment, set screw 605 is accessible through the at least one cutout, e.g., cutout 355b. At that point, the remaining cable 510 is tucked back into cutout 355a, trimmed, and then tucked back into the cutout 355a, or the like.

In one embodiment, e.g., when the ferrule is coupled with the actuator interface 621 in the dropper seatpost 300, the cable 510 is routed through the cutout 355, out the bottom of the dropper seatpost 300, through the bicycle frame 119, and then coupled with the control input. The ferrule is then coupled to the actuator interface 621. Thus, any remaining cable 510 is trimmed from the control input side.

The cutout 355 also allows the connecting of the cable 510 to the actuator interface 621 of the dropper seatpost 300 to be performed while the bottom of the dropper seatpost 300 (e.g., the portion below the cutout 355) is within the bicycle frame 119. This provides an ability for the dropper seatpost 300 to be held in place by the bicycle frame 119 for easier cable 510 manipulation, and also allows for a reduction in the length of needed cable 510 since the dropper seatpost 300 does not need to be outside of the bicycle frame 119 to couple the cable 510 with the actuator interface 621.

With reference now to FIG. 6, a cutaway view of the lower post 315 of the dropper seatpost 300, actuator interface 621, and the actuator 610 is shown in accordance with an embodiment. FIG. 6 includes the outer dropper seatpost 300, actuator 610, a cable guide 620 (e.g., a cable pathway), actuator interface 621, a cable retaining mechanism (such as set screw 605 or other cable retaining mechanism), a potentially trimmable portion 500 of the dropper seatpost 300, and multiple cutout(s) (e.g., 355a and 355b) about the dropper seatpost 300. In the multiple cutout embodiment, access to the set screw 605 is obtained through a first cutout 355a (or in another embodiment, 355b) while the cable 510 is routed through the cable guide 620 and out the second cutout 355b (or in another embodiment, 355a) allowing the user to pull the cable 510 taught while the set screw 605 (or other cable/actuator attachment/retaining member) is tightened. In one embodiment, the multiple cutout(s) (e.g., 355a and 355b of FIG. 6) are opposite one another on the dropper seatpost 300. In another embodiment, the multiple cutout(s) (e.g., 355, 355n of FIG. 5) are on the same general side of the dropper seatpost 300. In yet another embodiment, the multiple cutout(s) can be located in any orientation about the dropper seatpost 300.

In one embodiment, the dropper seatpost 300 has a single cutout 355 which allows a user to couple the cable 510 with the shaft (e.g., the actuator interface 621 for the dropper seatpost 300) and also route the cable 510 through the cable guide 620 (of FIG. 6) and out of the single cutout 355. The user can then pull the cable 510 taught while the set screw 605 is tightened.

In one embodiment, in addition to providing access to the set screw 605 for coupling purposes, the cutout(s) can further be used for replacing the cable-to-actuator interface 621 coupler, replacing the cable-to-actuator interface 621 retaining mechanism, lubricating or cleaning the actuator 610, actuator interface 621 (or components thereof), providing access to other components of the actuator 610, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A dropper seatpost assembly comprising:
an upper post;
a lower post, said lower post comprising a tubular geometry, said lower post telescopically coupled with said upper post to form a length adjustable seatpost;
an actuator located within said length adjustable seatpost, said actuator to allow or restrict a telescopic movement of said length adjustable seatpost, said actuator comprising:
an actuator interface located within said length adjustable seatpost, said actuator interface configured to couple with a control cable, said control cable to operate said actuator; and
at least one cutout in a sidewall of said lower post, the at least one cutout to provide access to the actuator interface of said actuator.

2. The dropper seatpost assembly of claim 1, wherein said at least one cutout is located at a portion said lower post that does not move with respect to a bicycle frame when the lower post is fixedly coupled with a seat tube of said bicycle frame.

3. The dropper seatpost assembly of claim 1, wherein said actuator and said actuator interface are located away from a bottom of said lower post, such that a portion of said lower post below said actuator and said actuator interface is trimmable without interfering with said actuator or said actuator interface.

4. The dropper seatpost assembly of claim 1, further comprising:

a user interface operatively coupled with said actuator interface via said control cable, said user interface to receive an input and provide said input to said actuator interface.

5. The dropper seatpost assembly of claim 4, wherein said user interface is mounted on a handlebar, and said control cable is routed from said user interface at said handlebar internally through a bicycle frame and a seat tube and into said lower post.

6. The dropper seatpost assembly of claim 1, wherein said at least one cutout is positioned proximal to a neutral bending axis of said lower post.

7. The dropper seatpost assembly of claim 1, further comprising:
a set screw, said set screw to couple said control cable with said actuator interface, said set screw accessible through said at least one cutout.

8. The dropper seatpost assembly of claim 1, further comprising:
a plurality of cutouts in said sidewall of said lower post.

9. The dropper seatpost assembly of claim 1, further comprising:
the upper post having an outer diameter (OD) smaller than an inner diameter (ID) of said lower post, to telescopically slide said upper post into said lower post.

10. The dropper seatpost assembly of claim 1, further comprising:
said upper post coupled with a saddle clamp assembly; and
said lower post comprising:
a top opening to receive said upper post;
a bottom opening to receive said control cable; and
a tubular sidewall axially extending between said top opening and said bottom opening of form said lower post, said tubular sidewall having an outer diameter (OD) and an inner diameter (ID),
said OD of said lower post smaller than an ID of a seat tube of a bicycle frame, said lower post for insertion into said seat tube.

11. A dropper seatpost assembly comprising:
an upper post configured for a saddle clamp assembly;
a lower post for insertion into a seat tube of a bicycle frame, the lower post to telescopically couple with said upper post to form a length adjustable seatpost, said lower post comprising:
a top opening to receive said upper post;
a bottom opening; and
a tubular sidewall axially extending between said top opening and said bottom opening of said lower post, said tubular sidewall having an outer diameter and an inner diameter;
an actuator located within said length adjustable seatpost, said actuator to allow or restrict a telescopic movement of said length adjustable seatpost, said actuator comprising:
an actuator interface located within said length adjustable seatpost, said actuator interface configured to couple with a control cable, said control cable to operate said actuator; and
at least one cutout in a portion of said tubular sidewall of said lower post, the at least one cutout to provide access to the actuator interface of said actuator.

12. The dropper seatpost assembly of claim 11, wherein said at least one cutout is located at a portion said lower post that does not move with respect to said bicycle frame when the lower post is fixedly coupled with said seat tube of said bicycle frame.

13. The dropper seatpost assembly of claim 11, wherein said actuator and said actuator interface are located away from a bottom of said lower post, such that a portion of said lower post below said actuator and said actuator interface is trimmable without interfering with said actuator or said actuator interface.

14. The dropper seatpost assembly of claim 11, further comprising:
   a user interface operatively coupled with said actuator interface via said control cable, said user interface to receive an input and provide said input to said actuator interface.

15. The dropper seatpost assembly of claim 14, wherein said user interface is mounted on a handlebar, and said control cable is routed from said user interface at said handlebar internally through said bicycle frame and said seat tube and into said lower post.

16. The dropper seatpost assembly of claim 11, wherein said at least one cutout is positioned proximal to a neutral bending axis of said lower post.

17. The dropper seatpost assembly of claim 11, further comprising:
   a set screw, said set screw to couple said control cable with said actuator interface, said set screw accessible through said at least one cutout.

18. An assembly comprising:
   an upper post configured for a saddle clamp assembly;
   a lower post for insertion into a seat tube of a bicycle frame, the lower post to telescopically couple with said upper post to form a length adjustable seatpost, said lower post comprising:
      a top opening to receive said upper post;
      a bottom opening; and
      a tubular sidewall axially extending between said top opening and said bottom opening of said lower post, said tubular sidewall having an outer diameter and an inner diameter;
   an actuator located within said length adjustable seatpost, said actuator to allow or restrict a telescopic movement of said length adjustable seatpost, said actuator comprising:
      an actuator interface located within said length adjustable seatpost, said actuator interface configured to couple with a control cable, said control cable to operate said actuator; and
   at least one cutout through a portion of said tubular sidewall of said lower post, the at least one cutout to provide access to the actuator interface.

19. The assembly of claim 18, wherein said actuator and said actuator interface are located away from a bottom of said lower post, such that a portion of said lower post below said actuator and said actuator interface is trimmable without interfering with said actuator or said actuator interface.

20. The assembly of claim 18, further comprising:
   a user interface operatively connected with said actuator interface via said control cable,
      said user interface to receive an input and provide said input to said actuator interface,
      said user interface mounted on a handlebar, and
      said control cable routed from said user interface at said handlebar internally through said bicycle frame and said seat tube and into said lower post.

* * * * *